US012800341B2

(12) United States Patent
Tang et al.

(10) Patent No.: US 12,800,341 B2
(45) Date of Patent: Nov. 17, 2026

(54) INCREMENTAL MAP BUILDING USING LEARNABLE FEATURES AND DESCRIPTORS

(71) Applicant: TOYOTA RESEARCH INSTITUTE, INC., Los Altos, CA (US)

(72) Inventors: Jiexiong Tang, Stockholm (SE); Rares Andrei Ambrus, San Francisco, CA (US); Hanme Kim, San Jose, CA (US); Vitor Guizilini, Santa Clara, CA (US); Adrien David Gaidon, Mountain View, CA (US); Xipeng Wang, Ann Arbor, MI (US); Jeffrey Walls, Mountain View, CA (US); Sudeep Pillai, Santa Clara, CA (US)

(73) Assignee: TOYOTA RESEARCH INSTITUTE, INC., Los Altos, CA (US)

( * ) Notice: Subject to any disclaimer, the term of this patent is extended or adjusted under 35 U.S.C. 154(b) by 217 days.

(21) Appl. No.: 18/645,240

(22) Filed: Apr. 24, 2024

(65) Prior Publication Data

US 2024/0271959 A1 Aug. 15, 2024

Related U.S. Application Data

(63) Continuation of application No. 17/230,942, filed on Apr. 14, 2021, now Pat. No. 11,994,408.

(60) Provisional application No. 63/009,941, filed on Apr. 14, 2020.

(51) Int. Cl.
*G01C 21/00* (2006.01)

(52) U.S. Cl.
CPC ..... *G01C 21/3837* (2020.08); *G01C 21/3826* (2020.08); *G01C 21/3896* (2020.08)

(58) Field of Classification Search
CPC ............ G01C 21/3837; G01C 21/3896; G01C 21/3826
See application file for complete search history.

(56) References Cited

U.S. PATENT DOCUMENTS

| | | | | |
|---|---|---|---|---|
| 10,726,264 | B2 * | 7/2020 | Sawhney | G06T 7/20 |
| 2015/0172626 | A1 * | 6/2015 | Martini | G06T 7/246 348/50 |
| 2019/0019030 | A1 | 1/2019 | Cansizoglu et al. | |

FOREIGN PATENT DOCUMENTS

| | | | |
|---|---|---|---|
| WO | 2018104563 | A2 | 6/2018 |

OTHER PUBLICATIONS

Tateno, et al., "CNN-SLAM: Real-time dense monocular SLAM with learned depth prediction", 2017 IEEE Conference on Computer Vision and Pattern Recognition (CVPR), Jul. 21-26, 2017.
Brachmann, et al., "Neural-Guided RANSAC: Learning Where to Sample Model Hypotheses", arXiv:1905.4132, ICCV, 2019.
(Continued)

*Primary Examiner* — Aaron L Troost
(74) *Attorney, Agent, or Firm* — Seyfarth Shaw LLP

(57) ABSTRACT

A method for labeling keypoints includes labeling, via a keypoint model, a first set of keypoints in a first image associated with a three-dimensional (3D) map of an environment, the first image having been captured during a first time period. The method also includes labeling, via the keypoint model, a second set of keypoints in a second image associated with the 3D map, the second image having been captured during a second time period. The method further includes updating, via the keypoint model, one of more of the first set of keypoints based on labeling the second set of keypoints.

20 Claims, 7 Drawing Sheets

(56) References Cited

OTHER PUBLICATIONS

Yi, et al., "Learning to Find Good Correspondences", arXiv:1711.05971, Proceedings of the IEEE Conference on Computer Vision and Pattern Recognition (CVPR), 2018.
Sarlin, et al., "From Coarse to Fine: Robust Hierarchical Localization at Large Scale", arXiv:1812.03506, Proceedings of the IEEE Conference on Computer Vision and Pattern Recognition (CVPR), 2019.
Dusmanu, et al., D2-Net: A Trainable CNN for Joint Detection and Description of Local Features, arXiv:1905.03561, Proceedings of the IEEE Conference on Computer Vision and Pattern Recognition (CVPR), 2019.
Schonberger, et al., "Structure-from-Motion Revisited", Proceedings of the IEEE Conference on Computer Vision and Pattern Recognition (CVPR), 2016.
Arandjelovic, et al., "NetVLAND: CNN architecture for weakly supervised place recognition", Proceedings of the IEEE Conference on Computer Vision and Pattern Recognition (CVPR), 2016.
Tang, et al., "Neural Outlier Rejection for Self-Supervised Keypoint Learning", arXiv:1912.10615, ICLR 2020.
Tang, et al., "Self-Supervised 3D Keypoint Learning for Ego-motion Estimation", arXiv:1912.03423, 2020.
Detone, et al., "SuperPoint: Self-Supervised Interest Point Detection and Description", CVPR 2018 Deep Learning for Visual SLAM Workshop, 2018.
Zeng, et al., "Inferring Point Clouds from Single Monocular Images by Depth Intermediation", arXiv: 1812.01402, Dec. 20, 2018.
Detone, et al., "Self-Improving Visual Odometry", arXiv:1812.03245, Dec. 8, 2018.

* cited by examiner

INCREMENTAL MAP BUILDING USING LEARNABLE FEATURES AND DESCRIPTORS

CROSS-REFERENCE TO RELATED APPLICATION

The present application is a continuation of U.S. patent application Ser. No. 17/230,942, filed on Apr. 14, 2021, and titled "INCREMENTAL MAP BUILDING USING LEARNABLE FEATURES AND DESCRIPTORS," which claims the benefit of U.S. Provisional Patent Application No. 63/009,941, filed on Apr. 14, 2020, and titled "INCREMENTAL MAP BUILDING USING LEARNABLE FEATURES AND DESCRIPTORS," the disclosure of which is expressly incorporated by reference in its entirety.

FIELD

Aspects of the present disclosure generally relate to keypoint matching, and more particularly to techniques and apparatuses for three-dimensional scene reconstruction.

BACKGROUND

Keypoint matching may be used for image registration and localization. For example, a query image may be localized by matching keypoints of the query image with keypoints of images in a database. Conventional neural networks may be trained to match keypoints. In some examples, conventional systems may detect features and match detected features independent from certain geometric transformations, such as image translation, scale, and rotation. In some such examples, the conventional systems extract keypoints (e.g., characteristic points, feature points, or interest points) and generate a descriptor for each keypoint. The descriptor may be a string describing the keypoint. In such examples, the descriptor may be independent from geometric transformation. A machine-vision system may use one or both of the keypoints or descriptors to identify or track features in one or more images.

SUMMARY

In one aspect of the present disclosure, a method for localization includes receiving a query image of a current environment of the agent captured by a sensor integrated with the agent. The method further includes receiving a target image comprising a first set of keypoints matching a second set of keypoints of the query image. The first set of keypoints may be generated based on a task specified for the agent. The method still further includes determining a current location based on the target image.

Another aspect of the present disclosure is directed to an apparatus for localization. The apparatus includes means for receiving a query image of a current environment of the agent captured by a sensor integrated with the agent. The apparatus further includes means for receiving a target image comprising a first set of keypoints matching a second set of keypoints of the query image. The first set of keypoints may be generated based on a task specified for the agent. The apparatus still further includes means for determining a current location based on the target image.

In another aspect of the present disclosure, a non-transitory computer-readable medium with non-transitory program code recorded thereon for localization is disclosed. The program code is executed by a processor and includes program code to receive a query image of a current environment of the agent captured by a sensor integrated with the agent. The program code further includes program code to receive a target image comprising a first set of keypoints matching a second set of keypoints of the query image. The first set of keypoints may be generated based on a task specified for the agent. The program code still further includes program code to determine a current location based on the target image.

Another aspect of the present disclosure is directed to an apparatus having a memory, one or more processors coupled to the memory, and instructions stored in the memory and operable, when executed by the processor, to cause the apparatus to receive a query image of a current environment of the agent captured by a sensor integrated with the agent. The execution of the instructions further cause the apparatus to receive a target image comprising a first set of keypoints matching a second set of keypoints of the query image. The first set of keypoints may be generated based on a task specified for the agent. The execution of the instructions also cause the apparatus to determine a current location based on the target image.

Aspects generally include a method, apparatus, system, computer program product, non-transitory computer-readable medium, user equipment, base station, wireless communications device, and processing system as substantially described with reference to and as illustrated by the accompanying drawings and specification.

The foregoing has outlined rather broadly the features and technical advantages of examples according to the disclosure in order that the detailed description that follows may be better understood. Additional features and advantages will be described. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
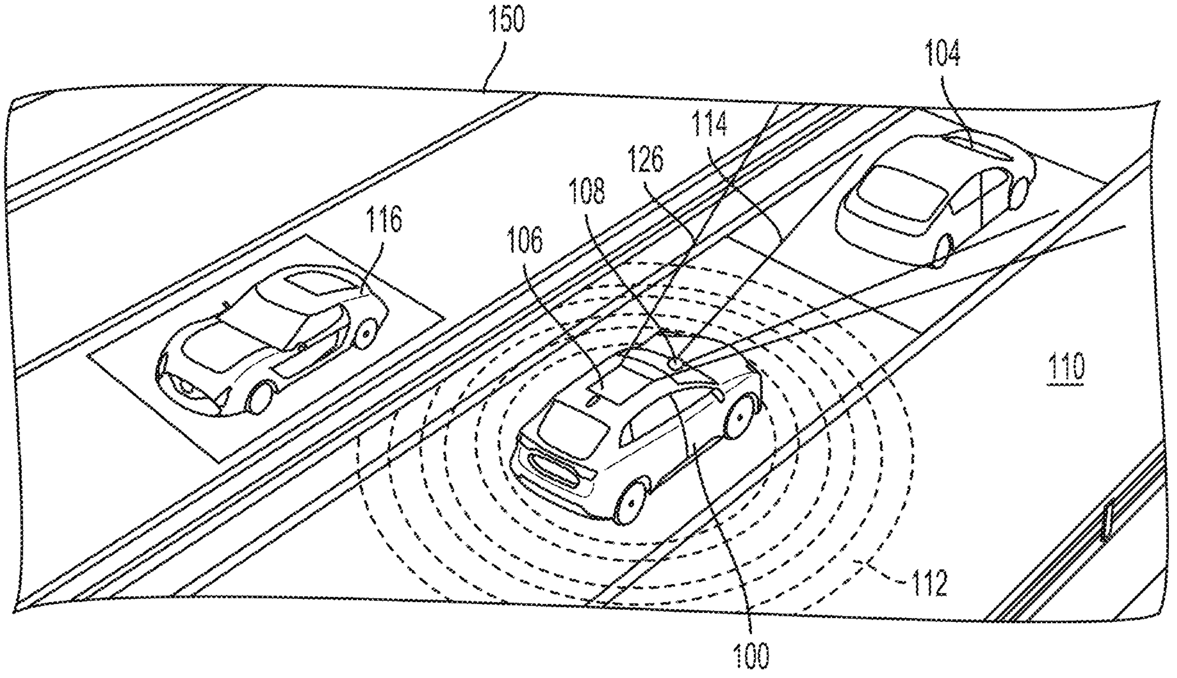
FIG. 1 illustrates an example of a vehicle in an environment according to aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. It will be apparent to those skilled in the art, however, that these concepts may be practiced without these specific details. In some instances, well-known structures and components are shown in block diagram form in order to avoid obscuring such concepts.

An agent, such as an autonomous agent, may reconstruct a three-dimensional map of a scene based on one or more images obtained from a sensor. The agent may also localize its location in an environment (e.g., a map of the environment) based on sensor information (e.g., GPS information). Localization and scene reconstruction may be used to perform various tasks, such as scene understanding, motion planning, and/or obstacle avoidance. For example, the agent may autonomously navigate through an environment based on the localization information and the scene reconstruction. Depth estimation may be used to understand (e.g., reconstruct) the structure of a scene.

Conventional machine-vision based systems, such as autonomous vehicles, may use a LIDAR sensor to build a 3D spatial representation of the world. The 3D spatial representation is localized against a pre-built 3D map. In such conventional systems, keypoint matching may be specified for localizing the 3D representation against the pre-built 3D map to reconstruct a three-dimensional map of a scene based on one or more images, such as 3D images, obtained from a sensor, such as a LIDAR sensor. That is, conventional keypoint matching systems match 3D keypoints obtained from a LIDAR sensor to 3D keypoints of the pre-built map.

In conventional systems, the keypoints of the pre-built 3D map, or images associated with the pre-built 3D map, may be selected offline based on pre-defined criteria. In some examples, the keypoints may be based on geometric features of an object in the pre-built 3D map. In some other examples, the keypoints may be hand-selected. It may be desirable to train a keypoint model to select keypoints based on a given task, such as localization, to improve an accuracy of the task. Additionally, or alternatively, it may be desirable to iteratively update keypoints as additional image of a location are captured. Aspects of the present disclosure are directed to training a keypoint model to select keypoints based on a given task. Some aspects of the present disclosure are also directed to an iterative method for generating maps with increased accuracy, while updating the learned keypoints (e.g., features) and descriptors.

Additionally, due to costs and accuracy, it may be desirable to match 2D keypoints to 3D keypoints of the pre-built map. Specifically, LIDAR sensors used for 3D keypoint matching may be costly, bulky, and resource-intensive. Additionally, the LIDAR sensors's accuracy may be reduced in some environments, such as, for example, rain, fog, wet surfaces, non-retroreflective road markings, etc. In contrast, a camera, such as a red-green-blue (RGB) camera, may provide both a dense semantic and spatial understanding of the scene by reasoning across space (stereo, multi-camera) and time (multi-view reconstruction). Additionally, a camera may be less costly, smaller, and less resource-intensive in comparison to LIDAR. Therefore, it may be desirable to use one or more cameras for a machine-vision systems. More particularly, in may be desirable to use a single camera for 3D scene reconstruction based on 2D keypoint matching.

Some aspects of the present disclosure improve keypoint matching systems to match a 2D keypoint obtained from an image, such as a monocular image, with a 3D keypoint of a pre-built map. In some implementations, the LIDAR sensor may be replaced by a camera. Therefore, aspects of the present disclosure improve an accuracy of 3D representations of an environment based on one or more images obtained from a camera.

FIG. 1 illustrates an example of an ego vehicle 100 (e.g., ego agent) in an environment 150 according to aspects of the present disclosure. As shown in FIG. 1, the ego vehicle 100 is traveling on a road 110. A first vehicle 104 (e.g., other agent) may be ahead of the ego vehicle 100, and a second vehicle 116 may be adjacent to the ego vehicle 100. In this example, the ego vehicle 100 may include a 2D camera 108, such as a 2D RGB camera, and a second sensor 106. The second sensor 106 may be another RGB camera or another type of sensor, such as RADAR and/or ultrasound. Additionally, or alternatively, the ego vehicle 100 may include one or more additional sensors. For example, the additional sensors may be side facing and/or rear facing sensors.

In one configuration, the 2D camera 108 captures a 2D image that includes objects in the 2D camera's 108 field of view 114. The second sensor 106 may generate one or more output streams. The 2D image captured by the 2D camera includes a 2D image of the first vehicle 104, as the first vehicle 104 is in the 2D camera's 108 field of view 114.

The information obtained from the sensors 106, 108 may be used to navigate the ego vehicle 100 along a route when the ego vehicle 100 is in an autonomous mode. The sensors 106, 108 may be powered from electricity provided from the vehicle's 100 battery (not shown). The battery may also power the vehicle's motor. The information obtained from the sensors 106, 108 may be used for depth estimations.

Place recognition refers to localizing an image in a pre-built map. In most systems, given a set of database images collected offline, learned keypoints and descriptors may be used to generate a globally consistent map. During online localization, a conventional system may obtain the top-K matching images from the database in response to a query image obtained from one or more sensors. Given the top-K matches, a set of corresponding sparse points from the pre-built map may be aligned with the query image.

Figure 2:
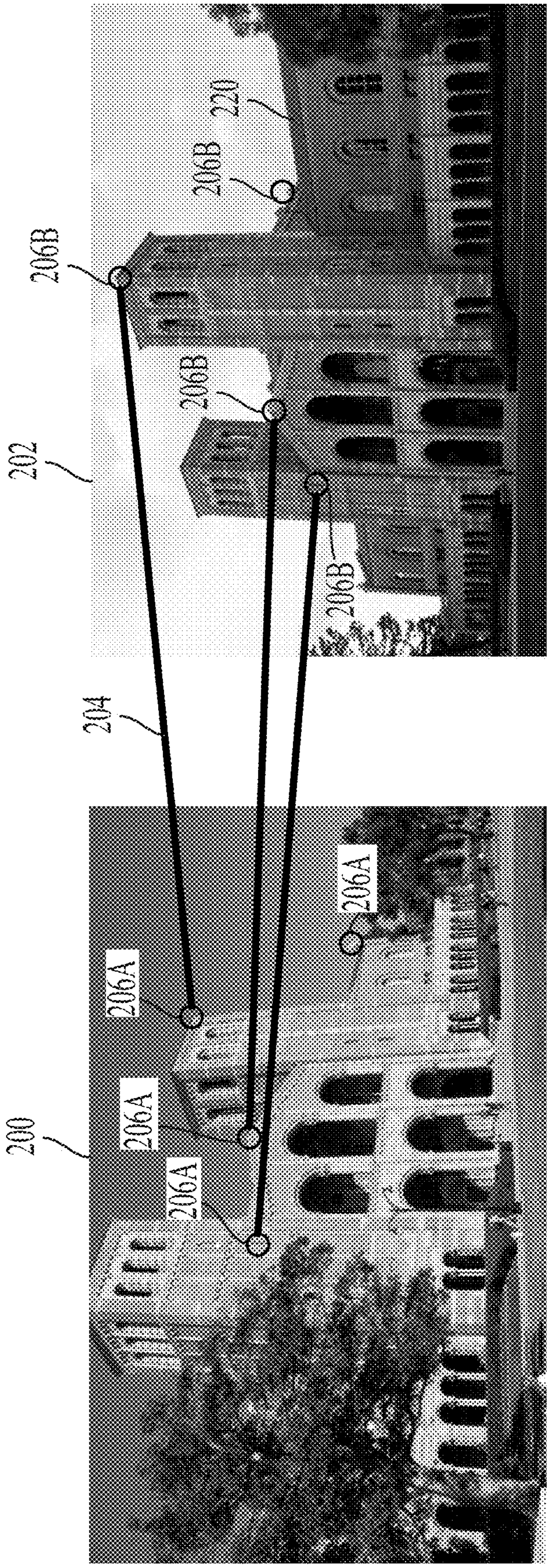
FIG. 2 is a diagram illustrating an example of matching keypoints in a query image and a target image, in accordance with aspects of the present disclosure.

FIG. 2 is a diagram illustrating an example of matching keypoints 206A and 206B in a query image 200 and a target image 202, in accordance with aspects of the present disclosure. In the example of FIG. 2, the target image 202 may be retrieved as a matching image associated with the query image 200 based on a number of keypoints 206A in the query image 200 that match keypoints 206B of the target image 202. In some examples, the target image 202 may be retrieved from a storage system, such as a memory device of the agent or a cloud-based storage system based on the number of keypoints 206A in the query image 200. The query image 200 may be unknown to the agent at a time when the image 200 is captured by a sensor of the agent.

In some examples, a distance between a location corresponding to the query image 200 and a location corresponding to the target image 202 satisfies a distance condition. For example, the distance may satisfy the distance condition when the distance between the location of the query image 200 and the location of the target image 202 is less than a distance threshold, such that the images 200 and 202 are acquired in a same environment.

As described, in some implementations, the query image 200 may be used for a search an image database. The search may be an example of a visual search of the image database. In some examples, the images in the image database may be geotagged. Additionally, in some examples, the images of the database may include images of a sparse 3D model. That is, a sparse 3D model of an environment may be generated from two or more images stored in the image database.

In such implementations, locations of top ranked images selected from the image database may be used as suggestions for a location of the query image 200. In some examples, an image extraction function produces a fixed size vector $f(I_i)$ given an image $I_i$, such as the query image 200. Specifically, the image extraction function may extract representations for the entire image database offline. At test time, the visual search is performed by finding a nearest database image to the query image 200 based on matching keypoints. In some examples, the image extraction function, or another module, may also extract features (e.g., keypoints) of the query image 200. The keypoints of the query image 200 may be matched with keypoints of one or more images in the image database. In one configuration, the keypoints may be matched on a global scale and then a local scale. Additionally, the keypoints may be directly matched. In some implementations, the nearest database image may be found via a nearest neighbor search, by sorting images based on a Euclidean distance between an image of the database and the quest image 200. In the example of FIG. 2, the target image 202 may be the nearest database image to the query image 200.

In some implementations, a map of an agent's surrounding environment may be generated based on the target image 202 retrieved from the image database. In some examples, a six degree of freedom (6-DoF) pose of the sensor may be estimated from the matching keypoints. Additionally, or alternatively, in some examples, a sparse 3D representation, such as a 3D map, of the agent's surrounding environment may be generated based on a pre-built map associated with the target image 202. The pre-built map may be stored in a memory of the agent and/or stored in a remote memory location, such as a cloud memory storage location. The 3D maps may be used for localization and navigation.

As shown in FIG. 2, matching keypoints 206A and 206B between the query image 200 and the target image 202 are depicted using connector lines 204 between corresponding features. Connector lines 204 may connect a center of receptive fields for matching keypoints 206A and 206B. Each keypoint 206A and 206B may correspond to a feature of an image 200 and 202. Thus, in some examples, a keypoint may be referred to as a feature. Additionally, as shown in FIG. 2, due to an angle of a sensor used for capturing an image, occlusion, and/or other factors, one or more keypoints 206A and 206B may not match. Additionally, in some implementations, each keypoint 206A and 206B may correspond with a respective descriptor. Each keypoint respective descriptor may be a string determined based on features of the image obtained from an encoding process of a keypoint model, such as a keypoint framework 300 described with reference to FIG. 3.

In the example of FIG. 2, the connector lines 204 are provided for illustrative purposes. A number of connector lines 204 may correspond to a number of matching keypoints. In some examples, during testing (e.g., real-world deployment), the connector lines 204 may not be generated between matched images 200 and 202.

In conventional systems, the keypoints defined for images stored in an image database may be defined offline based on pre-defined criteria. In some examples, the keypoints may be based on geometric features of an object in an image. In some other examples, the keypoints may be hand-selected. In such conventional systems, the keypoints may not be fine tuned for a given task and/or for a target environment.

It may be desirable to train a keypoint model to define custom keypoints based on a given task, such as localization, to improve an accuracy of the task. Aspects of the present disclosure use depth-aware keypoints to perform offline sparse map building. In one configuration, keypoints are tailored for performing 3D to 2D alignment. That is, the system is trained to select tailored keypoints to localize the image in the pre-built map. The keypoints may also be referred to as features.

Figure 3:
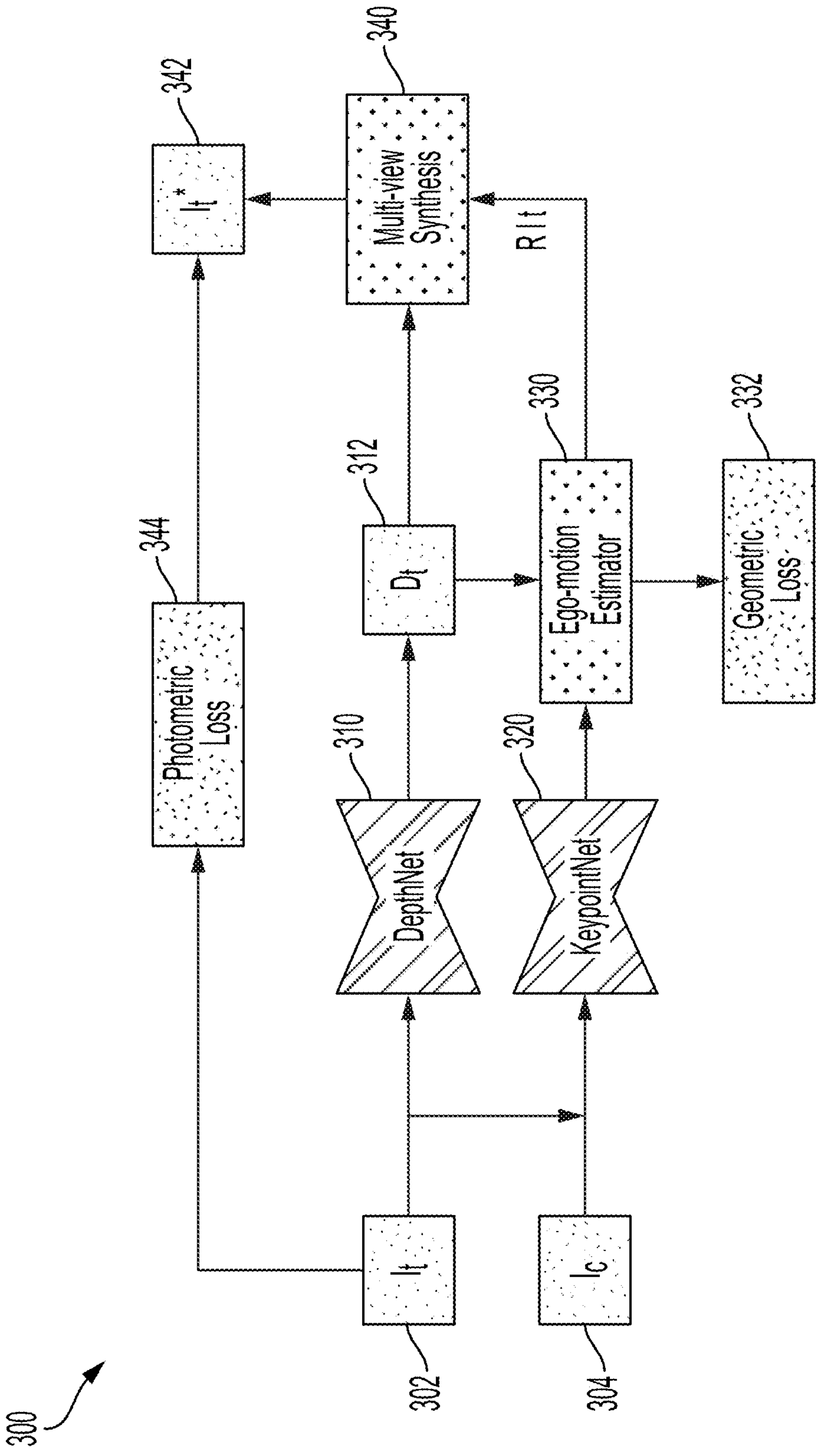
FIG. 3 is a block diagram illustrating a keypoint framework, in accordance with aspects of the present disclosure.

In some implementations, a monocular keypoint learning framework may be specified to identify 3D keypoint locations based on 2D images. FIG. 3 is a block diagram illustrating a keypoint framework 300, according to aspects of the present disclosure. The keypoint framework 300 may be a monocular framework. In one aspect of the present disclosure, the keypoint framework 300 may be used for offline map building. After labeling keypoints in the sparse map, the sparse map may be stored in an image database and used for localizing an agent in an environment based on a query image, such as the query image 200 of FIG. 2, captured by one or more sensors of the agent. For example, as described above, a query image may be matched with one or more target images stored in an image database. In some examples, the keypoint framework 300 may also associate a descriptor with each labeled keypoint.

In one configuration, the keypoint framework 300 receives two consecutive images, a target image ($I_t$) 302 and a context image ($I_c$) 304 of a monocular video. In this configuration, the target image $I_t$ 302 is provided as input to a depth network (DepthNet 310), which outputs a predicted dense depth map (e.g., $D_t$ 312), and the context image $I_c$ 304 is provided as input to a keypoint network (KeypointNet 320). For example, the DepthNet 310 may be implemented using a ResNet18 encoder followed by a decoder that outputs inverse depth at four scales.

In aspects of the present disclosure, two consecutive images (e.g., the target image $I_t$ 302 and the context image $I_c$ 304) are used as input to self-supervise 3D keypoint learning using the ego-motion estimator 330. In this configuration, the DepthNet 310 and the KeypointNet 320 are simultaneously trained in an end-to-end process using a combination of the photometric loss block 344, the geometric loss block 332, and the multi-view synthesis block 340. The keypoint framework 300 provides 3D keypoint estimation for long-term ego-motion estimation using a synthesized target image $I_t$*342.

As shown in FIG. 3, the keypoint framework 300 is configured to perform depth-aware keypoint learning purely from watching large volumes of unlabeled videos, without any need for supervision in the form of ground-truth or pseudo ground-truth labels. According to aspects of the present disclosure, this training also learns a 2D-to-3D key-point lifting function from the monocular videos, which is additionally used to accurately estimate the ego-motion between temporally adjacent images. The keypoint framework 300 is described in further detail below.

According to aspects of the present disclosure, monocular depth-aware keypoint learning may be formulated as follows. Given an input monocular image I, keypoint locations p, descriptors f, and scores s are regressed along with a dense depth map D. Functionally, three components are defined in the keypoint framework 300 that are used to enable depth-aware keypoint learning in an end-to-end differentiable setting: (i) KeypointNet$f_p$: I→k={p, f, s} that learns to regress N output keypoint locations $p\in\mathbb{R}^{2\times N}$, descriptors $f\in\mathbb{R}^{256\times N}$ and scores $s\in R^N$ given an input image $I\in\mathbb{R}^{3\times H\times W}$; (ii) DepthNet$f_D$: I→D, that learns to predict the scale-ambiguous dense depth map $D=f_D(I)$, and as a result, provides a mechanism to lift the sparse 2D keypoints $p\in\mathbb{R}^{2\times N}$ to 3D by directly sampling from the predicted dense depth D, $p^d=\pi^{-1}$ (p, $D_t$(pt)); and (iii) a fully-differentiable ego-motion estimator $$f_x(I_c, I_t) = x_{t\to c} = \begin{pmatrix} R & t \\ 0 & 1 \end{pmatrix}$$

$\in\mathbb{SE}(3)$, that predicts the relative six degrees of freedom (6-DoF) rigid-body transformation between the target image $I_t$ 302 and the context image $I_c$ 304. As described herein, $p_{t\to c}$, is used to denote the warped keypoints $p_t$ from the target image $I_t$ 302 to the context image $I_c$ 304 via the transformation $x_{t\to c}$.

Aspects of the present disclosure compute the depth at multiple scales during training; however, when referring to the associated sparse depth for a set of descriptors, the depth from the scale with the highest resolution is used. As should be recognized, in the monocular SfM setting, the depth scale is ambiguous up to an unknown scale factor.

In aspects of the present disclosure, the keypoint framework 300 leverages geometric transformations to self-supervise and boost keypoint learning by relying on the multi-view synthesis block 340. In one configuration, the multi-view synthesis block 340 leverages epipolar constraints in two-view camera geometry for robust 3D keypoint learning. That is, the multi-view synthesis block 340 is configured for self-supervised 3D keypoint learning that leverages the structured geometry of scenes in unlabeled monocular videos. For example, computed warped keypoints in the context image (e.g., $I_c$ 304) corresponding to the determined keypoints from the target image (e.g., $I_t$ 302) according to a nearest keypoint in the target image (e.g., $I_t$ 302), as illustrated in FIG. 4.

Figure 4:
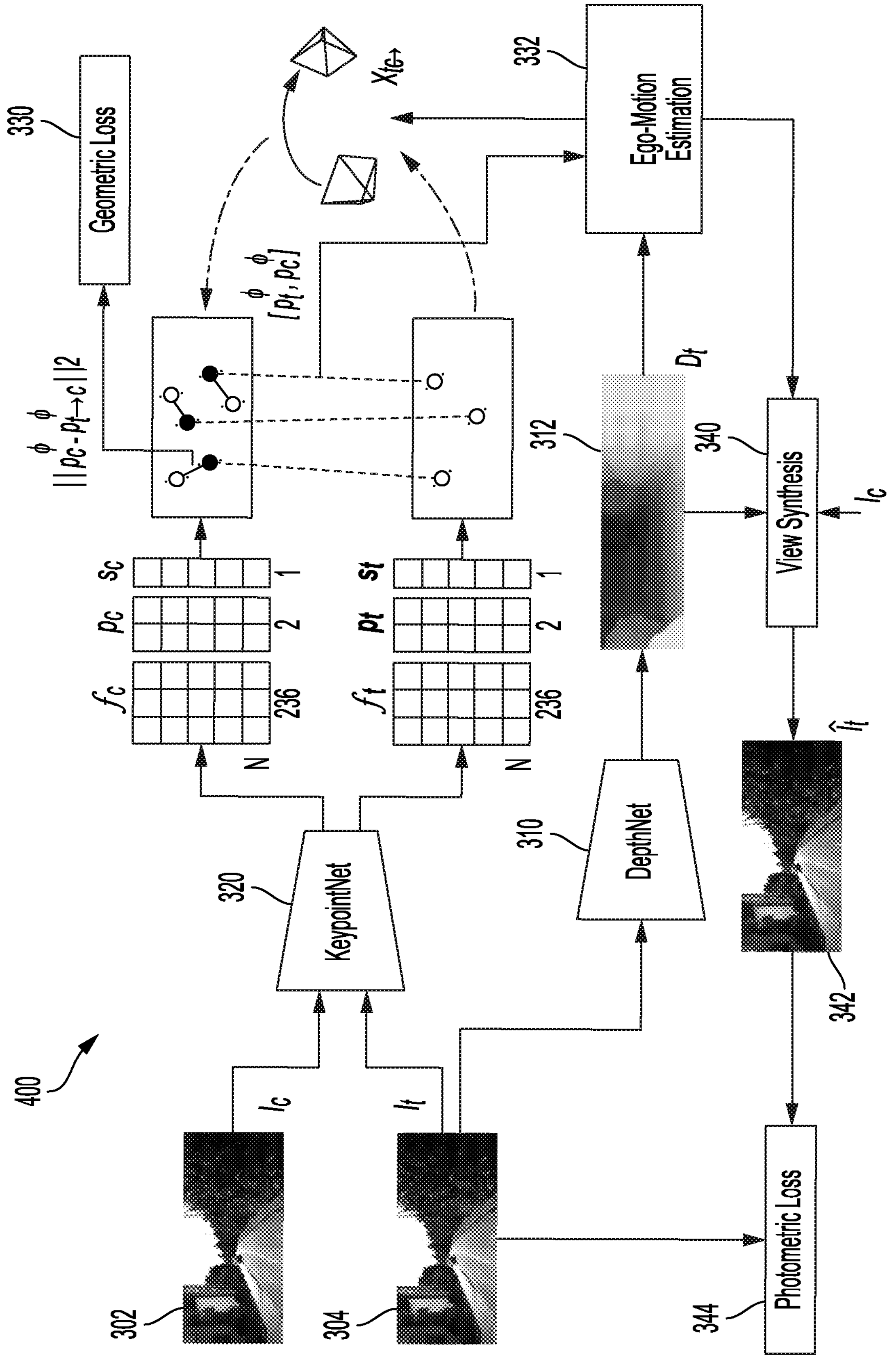
FIG. 4 illustrates a monocular structure-from-motion (SfM)-based three-dimensional (3D) keypoint learning, according to aspects of the present disclosure.

FIG. 4 illustrates a monocular structure-from-motion (SfM)-based 3D keypoint learning 400, according to aspects of the present disclosure. The monocular SfM-based 3D keypoint learning 400 provides a comparison between a homographic adaptation and self-supervised depth-aware keypoint learning, according to aspects of the present disclosure. In an adaptation step, a set of corresponding keypoints is computed:

$$p_t^\phi \leftrightarrow p_t^*$$

(e.g., $$p_t^\phi$$

from target image $I_t$ 602 along with $$p_c^\phi$$

in the context image $I_c$ 604). In this configuration, predicted descriptors $f_t$ and $f_c$ in the target and context images are used to compute $$p_c^\phi$$

via reciprocal matching in a descriptor space. For example, given the set of corresponding keypoints $$p_t^\phi \leftrightarrow p_c^\phi,$$

the associated ego-motion $x_{t\to c}$ is computed. Once the associated ego-motion $x_{t\to c}$ is known, the corresponding keypoint $p_t$ is computed using the ego-motion estimator 330. For example, the corresponding keypoint $p_t$ is computed by warping $p_t$ and inducing a combination of dense photometric loss (e.g., photometric loss block 344) via image-synthesis (e.g., multi-view synthesis block 340) and sparse geometric losses (e.g., geometric loss block 332).

In multi-view adaptation 450, the corresponding keypoint $p_t$ is computed via re-projection in a monocular two-view setting. This example uses: (i) a dense photometric loss based on the warped projection of $D_t$ in $I_s$ aimed at optimizing the dense depth prediction by the DepthNet 310; and (ii) a sparse geometric loss aimed at minimizing the re-projection error between corresponding keypoints $$k_s^d \text{ and } k_t^d$$

predicted by the KeypointNet 320.

As described in further detail below, relative poses of successive images (e.g., the target image $I_t$ 302 and the context image $I_c$ 304) of the monocular video and the depth-aware keypoints are matched based on nearest neighbor matching using the associated descriptors with a reciprocal check.

As shown in FIG. 4, correspondences $$p_t^\phi \in I_t \text{ and } p_c^\phi \in I_c,$$

are computed. Based on the computed correspondences $$p_t^\phi \in I_t \text{ and } p_c^\phi \in I_c,$$

a robust estimator is used to compute the 6-DoF rigid body pose transformation $x_{t\to c}$ between the target and context views. In aspects of the present disclosure, pose estimation may be performed by lifting the 2D keypoints from the target image 3D with the associated depth Dt. For example, a perspective-n-point (PnP) process is used to compute an initial relative pose transformation $$x_{t\to s}0 = \begin{pmatrix} R_o & t_o \\ 0 & 1 \end{pmatrix}$$

to geometrically match the keypoints in the target image to those in the context image. Specifically, to reduce:

$$E_{\psi}(X^0_{t\to c}) = \|p^{\phi}_{t\to c} - \pi(X^0_{t\to c} \cdot P^{\phi}_t)\|_2, \tag{1}$$

where $\pi(\cdot)$ is the standard pinhole camera projection model used to project the warped points $$(R \cdot p^d_t + t)$$

on to the context image $I_c$.

The estimated relative pose $x^0_{t\to c}$ may be obtained by reducing the residual error in Equation (1) using, for example, a Gaussian-Newton (GN) method with robustness to outliers. This step enables robust pose computation; however, this eliminates differentiable pose with respect to the 3D keypoints used for estimation. To alleviate this limitation, the resulting pose estimate can be used as an initial guess to an end-to-end differentiable pose estimation module within the self-supervised 3D keypoint learning framework, as shown in FIG. 3.

According to aspects of the present disclosure, differentiable pose estimation from 3D keypoints is described based on frame-to-keyframe tracking. In this aspect of the present disclosure, calculating the re-projected context 3D keypoints $$P^{\phi}_{t\to c}$$

from the target keypoints $$p^{\phi}_t$$

via the initial pose estimate $$x^0_{t\to c} = \begin{pmatrix} R_o & t_o \\ 0 & 1 \end{pmatrix},$$

a 3D residual can be formulated to recover the pose in closed-form:

$$E_{OP}(X_{t\to c}) = \|P_c - X_{t\to c} \cdot P_t\|_2, \tag{2}$$

$$\text{where } P_t = \pi^{-1}(p_t, D_t(p_t)),\ P_c = \pi^{-1}(p_s, d_S), \text{ and}$$

$$d_c = [X^0_{t\to c} \cdot P_t]_z.$$

The 3D residual in Equation 2 can be reduced by estimating the rotation and translation separately using a closed-form solution on an established inlier set. The rotation is first estimated by subtracting the means of the points and minimizing Equation 3 by solving singular value decomposition (SVD) in closed-form (e.g., the Orthogonal Procrustes problem:

$$E(\mathcal{R}) = \|P^*_c - R \cdot P^*_t\|_2, \text{ where } P^*_i = P_i - \bar{P}_i, \tag{3}$$

$$U\sum V = SVD\left(\sum (P^*_c)^T (P^*_t)\right), \text{ where } R = VU^T. \tag{4}$$

Once the rotation R is computed, the translation t can be directly recovered by minimizing:

$$t = p^*_c - \mathcal{R} \cdot P^*_t. \tag{5}$$

Thus, the gradients for the pose rotation and translation can be effectively propagated with respect to the lifted 3D keypoint locations, making the overall pose estimation fully-differentiable. The differentiable pose estimated using the 2D keypoints from the context image and 3D keypoints from the target image couples keypoint and depth estimation. This allows further optimization of both predictions using an overall keypoint learning objective.

Aspects of the present disclosure are directed to self-supervised learning of depth-aware keypoints in a fully end-to-end differentiable manner using a combination of photometric and geometric losses. As shown in FIG. 3, both the KeypointNet 320 and the DepthNet 310 are jointly optimized using the following losses:

The total keypoint loss is composed of three terms: $\mathcal{L}_{kpn} = \mathcal{L}_{geom} + \beta_1 \mathcal{L}_{desc} + \beta_2 \mathcal{L}_{score}$. Specifically, the total keypoint loss may be based on a geometric loss ($\mathcal{L}_{geom}$). For the geometric loss, using $X_{t\to c}$ and $$P^{\phi}_t,$$

the warped keypoints from image $I_t$ to $I_c$ may be determined as:

$$p^{\phi}_{t\to c} = \pi(X_{t\to c} P^{\phi}_t) = \pi(\mathcal{R} \cdot P^{\phi}_t + t). \tag{6}$$

The total keypoint loss may also be based on a descriptor loss ($\mathcal{L}_{desc}$). In some examples, the descriptor loss uses nested hardest sample mining to self-supervise the keypoint descriptors between the context image $I_c$ 304 and the target image $I_t$ 302. Given anchor descriptors $f_t$ from the target image $I_t$ 302 and their associated positive descriptors in the $$f_+ = f^{MV}_t$$

in the context image $I_c$ 304, the triplet loss is defined as:

$$L_f = \sum_1 \max(0, \|f, f_+\|_2 - \|f, f_-\|_2 + m), \tag{7}$$

where f_ is the hardest descriptor sample mined from $f_8$ with margin m. The total keypoint loss may be further based on a score loss ($\mathcal{L}_{score}$). In this example, the score loss is introduced to identify reliable and repeatable keypoints in the matching process. In particular, aspects of the present disclosure ensure that (i) the feature-pairs have consistent scores across matching views; and (ii) the network learns to predict high scores for good keypoints with low geometric error and strong repeatability. For example, this objective is achieved by minimizing the squared distance between scores for each matched keypoint-pair, and minimizing or maximizing the average score of a matched keypoint-pair if the distance between the paired keypoints is greater or less than the average distance respectively:

$$\mathcal{L}_{score} = \left[\frac{(s_t^\phi + s_c^\phi)}{2} \cdot \left(\|p_{t\to c}^\phi, p_c^\phi\|_2 - \overline{d}\right) + (s_t^\phi - s_c^\phi)^2\right], \tag{8}$$

where $s_t^\phi$ and $s_c^\phi$ are the scores of the source and target frames respectively, and $\overline{d}$ is the average re-projection error of associated points in the current frame, given by $$\overline{d} = \frac{(s_t^\phi + s_c^\phi)}{2}.$$

Here, d refers to the 2D Euclidean distance in feature space between L matching keypoints.

In some implementations, in addition to the geometric losses, a dense photometric loss is used to learn dense depth in the DepthNet 310, for example, by warping the depth from the target image $I_t$ 302 from the depth map $D_t$ 312 along the predicted ego-motion estimate $x_{t\to c}$ to the context image $I_c$, 304 (e.g., context image frame). In addition, a structural similarity (SSIM) loss is imposed between the synthesized target image $I_t$*342 and the original target image $I_t$. 302. The resulting dense photometric loss is regularized with an LI pixel-wise loss term:

$$\mathcal{L}_{photo}(I_t, \hat{I}_t) = \gamma\frac{1 - SSIM(I_t, \hat{I}_t)}{2} + (1-\gamma)\,|(I_t, \hat{I}_t)|. \tag{9}$$

To account for parallax errors and the presence of dynamic objects in videos, the pixel-wise minimum is computed between the set of synthesized context images $I_c \in I_c$ (e.g., context images) and the target image $I_t$ 302. In addition, static pixels may be masked out by removing those which have a warped photometric loss $\mathcal{L}_{photo}$ $(I_t, \hat{I}_t)$ higher than their corresponding unwarped photometric loss $\mathcal{L}_{photo}$ $(I_t, I_S)$, calculated using the original context image without view-synthesis. This has the effect of removing pixels with non-changing appearances, including static frames and dynamic objects with no relative motion.

To regularize depth in texture-less low-image gradient regions, an edge-aware term is incorporated:

$$L_{sm} = |\delta_x \hat{D}_t|\, e^{-|\delta_x I_t|} + |\delta_y \hat{D}_t| e^{-|\delta_y I_t|}. \tag{10}$$

As described above, the depth regressed from the depth map $D_t$ 312 is scale-ambiguous. While recovering scale-consistent depth is not a strict specification for the proposed framework to learn 3D keypoints, scale-consistency is important for tasks that involve accurate ego-motion estimation. In this aspect of the present disclosure, a depth consistency term is incorporated to discourage scale-drift between dense depth predictions in adjacent frames:

$$\mathcal{L}_{const} = \frac{\|D_t(p_t^\phi) - D_c(p_t^\phi)\|}{D_t(p_t^\phi) + D_c(p_t^\phi)}, \tag{11}$$

where $\mathcal{L}_c$ is a sparse loss defined based on the correspondences $$p_t^\phi \leftrightarrow p_c^\phi.$$

According to aspects of the present disclosure, using the pair of the target image (e.g., $I_t$ 302) and the context image (e.g., $I_c$ 304), the losses noted above are computed. Additionally, homography adaptation (e.g., translation, rotation, scaling, cropping, and symmetric perspective transformation, etc.) is performed starting from the target image (e.g., $I_t$ 302). Additionally, a per pixel Gaussian noise, color jitter, and Gaussian blur may be applied for additional robustness.

In some implementations, the keypoint framework 300 may be trained to generate keypoints to improve 3D to 2D keypoint alignments. Such alignments may be an example of matching a 2D image captured by a monocular sensor, such as an RGB camera, to a pre-built 3D map. In some examples, keypoints of the 2D image may be matched with keypoints of the pre-built 3D map. Aspects of the present disclosure are not limited to tailor keypoints for 3D to 2D keypoint alignments. Other tasks are also contemplated. In some examples, the keypoints may be customized based on an environment and/or a given task, such as localization.

Additionally, some conventional systems use consecutive frames for keypoint training. In some implementations, in contrast to some conventional systems, the keypoint framework 300 may be trained with images captured at different times and/or with different sensors, such as different RGB cameras. One or more of the different sensors may be integrated with one or more different agents, respectively. Such training data may be more diverse than images captured at a same time from a same sensor. In some examples, keypoints learned from the diverse training data may improve feature (e.g., keypoint) matching across different times of the day from different positions (e.g., camera positions).

In some such implementations, images from one or more pre-built maps with correct localization information may be used for the image database. In such implementations, the keypoint framework 300 trained with images captured at different times and/or with different sensors, such as different RGB cameras, may generate keypoints for the pre-built maps with correct localization information.

Additionally, or alternatively, it may be desirable to iteratively update keypoints as additional images of a location are captured. Iteratively updating keypoints may ensure keypoints of a database image are up-to-date, while also maintaining a set of keypoints optimized for the given task. Aspects of the present disclosure are directed to an iterative method for generating maps with increased accuracy, while updating the learned features and descriptors. In one configuration, an iterative method incrementally updates a sparse 3D representation of an environment using monocular images. The incremental updating is different from conventional structure-from-motion methods. The incremental updating adds new observations to the map while also updating the learned keypoints and descriptors when new data is available.

In some examples, the map may be updated at map updating network located remote from the agent. The agent may transmit observations to the remote location via wireless transmissions. In such examples, the remote location may transmit map updates to the agent. The map updates may be an incremental update to an existing map stored in a memory of the agent or an updated map intended to replace an existing map stored in a memory of the agent. In some other examples, the agent performs the incremental updates via a map updating network stored at the agent.

Figure 5A:
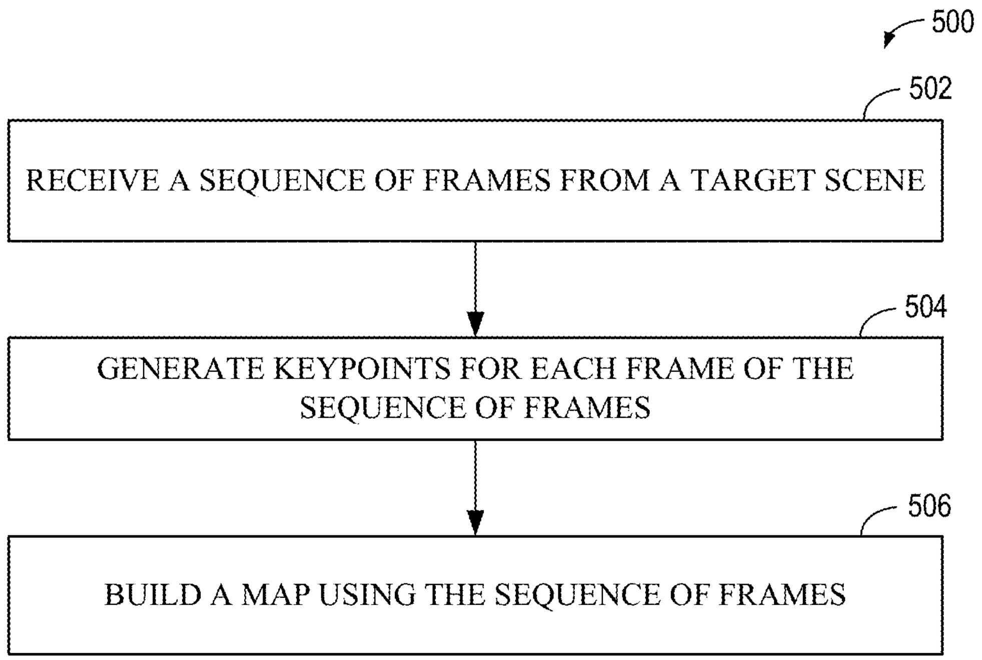
FIG. 5A is a diagram illustrating a process for map-building, in accordance to aspects of the present disclosure.

FIG. 5A is a flow diagram illustrating a process 500 for map-building, in accordance with aspects of the present disclosure. As shown in FIG. 5A, at block 502, a keypoint network (e.g., depth-aware keypoint network) receives a sequence of frames (e.g., video) from a target scene. The keypoint network may be an example of the keypoint framework 300, as described with reference to FIGS. 3 and 4. As described, the keypoint framework 300 may be an example of an artificial neural network. The keypoint network may also be referred to as a keypoint model.

At block 504, a keypoint network may generate keypoints for each frame of the sequence of frames. In some examples, the keypoint network may also generate a descriptor for each keypoint. During training, the keypoint network may be trained on a consecutive sequence of frames depicting an environment. In such examples, the consecutive sequence of frames may be from a single sensor. In other examples, the keypoint network may be trained on different frames depicting an environment, where the different frames may be captured at different times of a day by different sensors, such as different RGB cameras. The frames may capture a panoramic view of an environment.

At block 506, the keypoint network builds a map using the sequence of frames. The map may be an example of a 3D representation of an environment. Images of the map with corresponding keypoints and descriptors may be stored in an image database. The stored images may be used for matching with a query image, as described above. In some examples, the matching may be aided by additional coarse localization information, as acquired by location sensor, such as a GPS sensor. In some other examples, the training and map building may be performed offline, and the matching may be performed online.

In some examples, the map may be built at map building network located remote from the agent. The map building network may include the keypoint network discussed with reference to FIG. 5A. The agent may transmit observations to the remote location via wireless transmissions. In such examples, the remote location may transmit the map to the agent. In some other examples, the agent builds the map via a map building network stored at the agent.

Figure 5B:
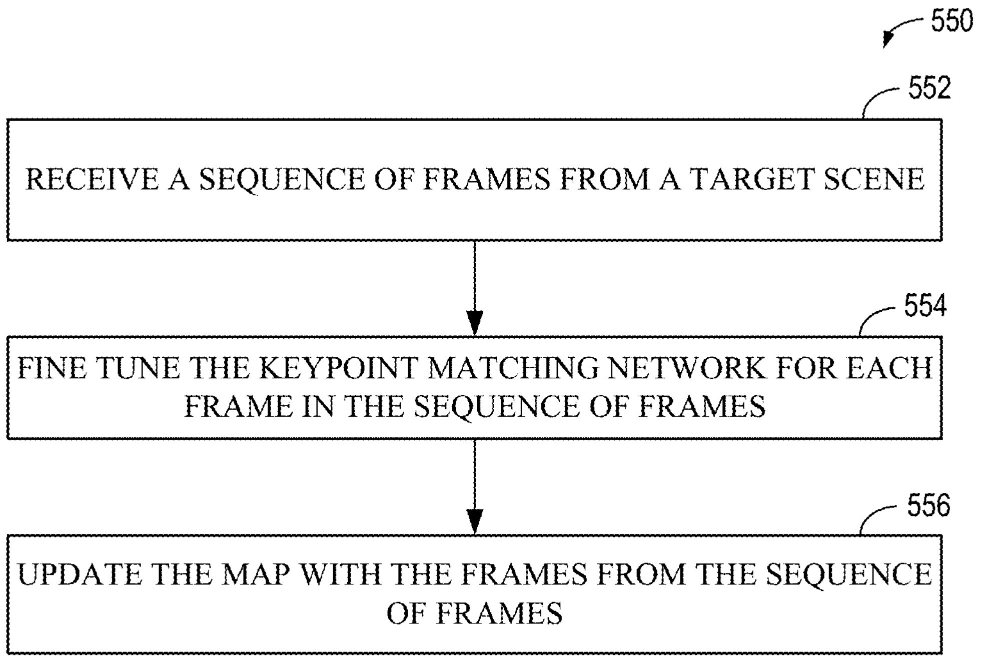
FIG. 5B is a diagram illustrating a process for incremental map-building, in accordance with aspects of the present disclosure.

In some implementations, after generating the map, the system may incrementally update the map. FIG. 5B is a flow diagram illustrating a process 550 for incremental map-building, in accordance with aspects of the present disclosure. The map-building of FIG. 5B may be performed offline. The incremental map-building may also be referred to as continuous online map-building. In some other examples, the map-building of FIG. 5B may be performed online.

As shown in FIG. 5B, as block 552, the keypoint network receives a sequence of frames of a target scene. The sequence of frames is different from the sequence of frames used to train the network. At block 554, the keypoint network is fine tuned for each frame in the sequence of frames. Specifically, the fine tuning is performed with temporarily adjacent frames in the sequence of frames and the closest matching images in the pre-built map. At block 556, keypoints and descriptors of the map may be updated based on the keypoints and descriptors learned from frames of the sequence of frames. The process may be continuously repeated as new frame sequences are obtained.

As discussed, conventional systems may use LIDAR sensors to build a 3D spatial representation of an environment. LIDAR sensors have shown strong performance, especially in high-dynamic range regimes. Cameras, such as RGB cameras, may provide both a dense semantic and spatial understanding of a scene by reasoning across space (stereo, multi-camera) and time (multi-view reconstruction). Aspects of the present disclosure accurately localize camera images into a map, thereby improving various applications, such as using a map as a sensory input, identifying static and dynamic objects, and/or correcting misdetected objects or misclassified pixels.

Aspects of the present disclosure may be used for 3D scene reconstruction and understanding from monocular depth and ego-motion estimation. The ability to bootstrap and learn a metric depth network from monocular camera sensors and localization information (e.g., GPS) may benefit fusion stages for 3D spatial reconstruction (either from single/multi-view monocular imagery, or from both LiDAR and monocular imagery combined).

Visual sensors, such as an RGB camera, may augment, complement, or substitute information obtained from LIDAR sensors.

Figure 6:
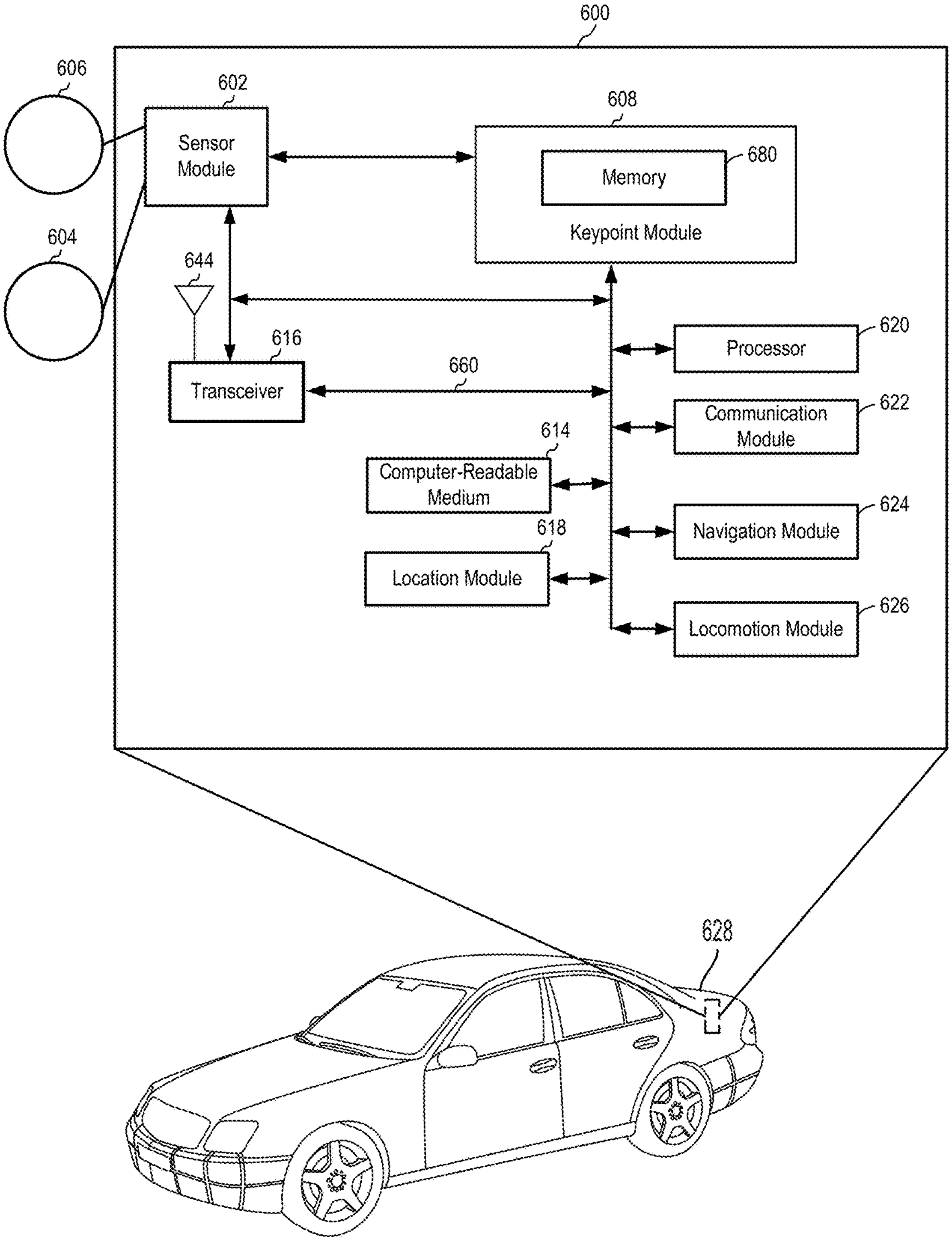
FIG. 6 is a diagram illustrating an example of a hardware implementation for a localization system 600, in accordance with aspects of the present disclosure.

FIG. 6 is a diagram illustrating an example of a hardware implementation for a localization system 600, in accordance with aspects of the present disclosure. The localization system 600 may be a component of a vehicle, a robotic device, or another device. For example, as shown in FIG. 6, the image localization system 600 is a component of a vehicle 628. Aspects of the present disclosure are not limited to the image localization system 600 being a component of the vehicle 628, as other types of agents, such as a bus, boat, drone, or robot, are also contemplated for using the localization system 600.

The vehicle 628 may operate in one or more of an autonomous operating mode, a semi-autonomous operating mode, and a manual operating mode. Furthermore, the vehicle 628 may be an electric vehicle, a hybrid vehicle, a fuel vehicle, or another type of vehicle.

The image localization system 600 may be implemented with a bus architecture, represented generally by a bus 660. The bus 660 may include any number of interconnecting buses and bridges depending on the specific application of the image localization system 600 and the overall design constraints. The bus 660 links together various circuits including one or more processors and/or hardware modules, represented by a processor 620, a communication module 622, a location module 618, a sensor module 602, a locomotion module 626, a navigation module 624, and a computer-readable medium 614. The bus 660 may also link various other circuits such as timing sources, peripherals, voltage regulators, and power management circuits, which are well known in the art, and therefore, will not be described any further.

The image localization system 600 includes a transceiver 616 coupled to the processor 620, the sensor module 602, a keypoint module 608, the communication module 622, the location module 618, the locomotion module 626, the navigation module 624, and the computer-readable medium 614. The transceiver 616 is coupled to an antenna 644.

The image localization system 600 includes the processor 620 coupled to the computer-readable medium 614. The processor 620 performs processing, including the execution of software stored on the computer-readable medium 614 providing functionality according to the disclosure. The software, when executed by the processor 620, causes the image localization system 600 to perform the various functions described for a particular device, such as the vehicle 628, or any of the modules 602, 608, 614, 616, 618, 620, 622, 624, 626. The computer-readable medium 614 may also be used for storing data that is manipulated by the processor 620 when executing the software.

The sensor module 602 may be used to obtain measurements via different sensors, such as a first sensor 606 and a second sensor 604. The first sensor 606 may be a vision sensor, such as a stereoscopic camera or a red-green-blue (RGB) camera, for capturing 2D images. The second sensor 604 may be a ranging sensor, such as a light detection and ranging (LIDAR) sensor or a radio detection and ranging (RADAR) sensor. Of course, aspects of the present disclosure are not limited to the aforementioned sensors as other types of sensors, such as, for example, thermal, sonar, and/or lasers are also contemplated for either of the sensors 604, 606.

The measurements of the first sensor 606 and the second sensor 604 may be processed by one or more of the processor 620, the sensor module 602, the keypoint module 608, the communication module 622, the location module 618, the locomotion module 626, the navigation module 624, in conjunction with the computer-readable medium 614 to implement the functionality described herein. In one configuration, the data captured by the first sensor 606 and the second sensor 604 may be transmitted to an external device via the transceiver 616. The first sensor 606 and the second sensor 604 may be coupled to the vehicle 628 or may be in communication with the vehicle 628.

The location module 618 may be used to determine a location of the vehicle 628. For example, the location module 618 may use a global positioning system (GPS) to determine the location of the vehicle 628. The communication module 622 may be used to facilitate communications via the transceiver 616. For example, the communication module 622 may be configured to provide communication capabilities via different wireless protocols, such as WiFi, long term evolution (LTE), 4G, etc. The communication module 622 may also be used to communicate with other components of the vehicle 628 that are not modules of the localization system 600.

The locomotion module 626 may be used to facilitate locomotion of the vehicle 628. As an example, the locomotion module 626 may control a movement of the wheels. As another example, the locomotion module 626 may be in communication with one or more power sources of the vehicle 628, such as a motor and/or batteries. Of course, aspects of the present disclosure are not limited to providing locomotion via wheels and are contemplated for other types of components for providing locomotion, such as propellers, treads, fins, and/or jet engines.

The image localization system 600 also includes the navigation module 624 for planning a route or controlling the locomotion of the vehicle 628, via the locomotion module 626. The navigation module 624 may override user input when the user input is expected (e.g., predicted) to cause a collision. The modules may be software modules running in the processor 620, resident/stored in the computer-readable medium 614, one or more hardware modules coupled to the processor 620, or some combination thereof.

The keypoint module 608 may include a memory 680. The memory 680 may be integrated with the keypoint module 608 or may be a component of the image localization system 600. The memory 780 may include volatile and/or non-volatile memory. For example, the memory 780 may be read only memory (ROM), programmable ROM (PROM), electronic programmable ROM (EPROM), electronic erasable PROM (EEPROM), flash memory, random access memory (RAM), or other types of volatile or non-volatile memory. Additionally, the RAM may be, for example, synchronous RAM (SRAM), dynamic RAM (DRAM), synchronous DRAM (SDRAM), double data rate SDRAM (DDR SDRAM), enhanced SDRAM (ESDRAM), sync link DRAM, (SLDRAM), direct RAM bus RAM (DRRAM), or other types of RAM.

In some examples, working in conjunction with one or more of the sensors 606 and 604, the sensor module 602, the memory 680, the transceiver 616, and the communication module 622, the keypoint module 608 receives a query image of a current environment of the vehicle 628 captured by a sensor integrated with the vehicle 628. Additionally, working in conjunction with one or more of the sensors 606 and 604, the sensor module 602, the memory 680, the transceiver 616, and the communication module 622, the keypoint module 608 receives a target image comprising a first set of keypoints matching a second set of keypoints of the query image. The first set of keypoints may be generated based on a task specified for the vehicle 628. Furthermore, working in conjunction with one or more of the sensors 606 and 604, the sensor module 602, the location module 618, the memory 680, the transceiver 616, and the communication module 622, the keypoint module 608 determines a current location of the vehicle 628 based on the target image.

In some examples, working in conjunction with one or more of the sensors 606 and 604, the sensor module 602, the location module 618, the navigation module 624, the locomotion module 626, the memory 680, the transceiver 616, and the communication module 622, the keypoint module 608 control one or more actions of the vehicle 628 based on the determined location. For example, the keypoint module 608 may cause the vehicle 628 to navigate to a specific location or avoid a collision with one or more object in the determined location.

The National Highway Traffic Safety Administration (NHTSA) has defined different "levels" of autonomous vehicles (e.g., Level 0, Level 1, Level 2, Level 3, Level 4, and Level 5). For example, if an autonomous vehicle has a higher level number than another autonomous vehicle (e.g., Level 3 is a higher level number than Levels 2 or 1), then the autonomous vehicle with a higher level number offers a greater combination and quantity of autonomous features relative to the vehicle with the lower level number. These different levels of autonomous vehicles are described briefly below.

Level 0: In a Level 0 vehicle, the set of advanced driver assistance system (ADAS) features installed in a vehicle provide no vehicle control, but may issue warnings to the driver of the vehicle. A vehicle which is Level 0 is not an autonomous or semi-autonomous vehicle.

Level 1: In a Level 1 vehicle, the driver is ready to take driving control of the autonomous vehicle at any time. The set of ADAS features installed in the autonomous vehicle may provide autonomous features such as: adaptive cruise control (ACC); parking assistance with automated steering; and lane keeping assistance (LKA) type II, in any combination.

Level 2: In a Level 2 vehicle, the driver is obliged to detect objects and events in the roadway environment and respond if the set of ADAS features installed in the autonomous vehicle fail to respond properly (based on the driver's subjective judgement). The set of ADAS features installed in the autonomous vehicle may include accelerating, braking, and steering. In a Level 2 vehicle, the set of ADAS features installed in the autonomous vehicle can deactivate immediately upon takeover by the driver.

Level 3: In a Level 3 ADAS vehicle, within known, limited environments (such as freeways), the driver can safely turn their attention away from driving tasks, but must still be prepared to take control of the autonomous vehicle when needed.

Level 4: In a Level 4 vehicle, the set of ADAS features installed in the autonomous vehicle can control the autonomous vehicle in all but a few environments, such as severe weather. The driver of the Level 4 vehicle enables the automated system (which is comprised of the set of ADAS features installed in the vehicle) only when it is safe to do so. When the automated Level 4 vehicle is enabled, driver attention is not required for the autonomous vehicle to operate safely and consistent within accepted norms.

Level 5: In a Level 5 vehicle, other than setting the destination and starting the system, no human intervention is involved. The automated system can drive to any location where it is legal to drive and make its own decision (which may vary based on the jurisdiction where the vehicle is located).

A highly autonomous vehicle (HAV) is an autonomous vehicle that is Level 3 or higher. Accordingly, in some configurations the vehicle 628 may be one of a Level 0 non-autonomous vehicle, a Level 1 autonomous vehicle, a Level 2 autonomous vehicle, a Level 3 autonomous vehicle, a Level 4 autonomous vehicle, or a Level 5 autonomous vehicle.

Figure 7:
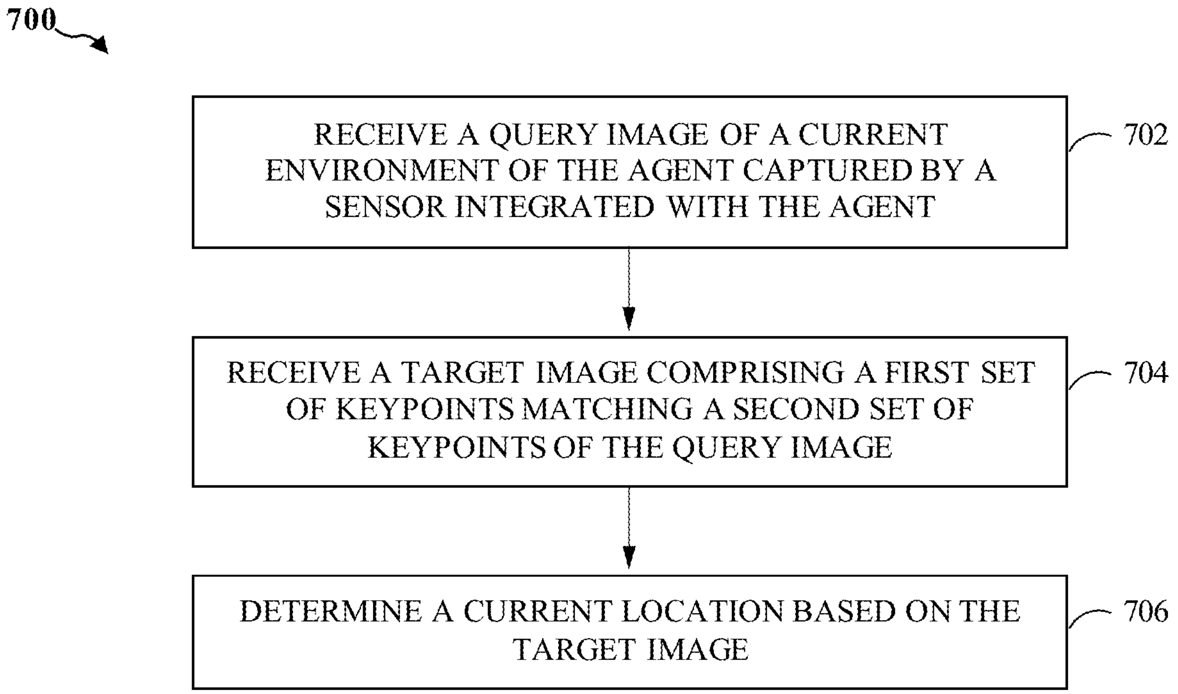
FIG. 7 is a diagram illustrating an example process performed, for example, with a keypoint model, in accordance with various aspects of the present disclosure.

FIG. 7 is a diagram illustrating an example process 700 performed, for example, with a keypoint model, in accordance with various aspects of the present disclosure. The example process 700 is an example of using keypoint to match a query image with a target image. In some implementations, the keypoints may be tailored based on a specified task. Additionally, or alternatively, the keypoints may be incrementally updated. In some implementations, the process 700 may be performed by a keypoint matching model, such as the keypoint framework 400 described above with reference to FIGS. 3 and 4. The semantically aware keypoint matching model may be a component of an agent, such as the ego vehicle 100 or the vehicle 628 described above with reference to FIGS. 1 and 6, respectively.

In some implementations, the process 700 begins in block 702 with receiving a query image of a current environment of the agent captured by a sensor integrated with the agent. At block 704, the process 700 receives a target image comprising a first set of keypoints matching a second set of keypoints of the query image. The first set of keypoints may be generated based on a task specified for the agent. Additionally, at block 706, the process 700 determines a current location of the agent based on the target image.

Based on the teachings, one skilled in the art should appreciate that the scope of the present disclosure is intended to cover any aspect of the present disclosure, whether implemented independently of or combined with any other aspect of the present disclosure. For example, an apparatus may be implemented or a method may be practiced using any number of the aspects set forth. In addition, the scope of the present disclosure is intended to cover such an apparatus or method practiced using other structure, functionality, or structure and functionality in addition to, or other than the various aspects of the present disclosure set forth. It should be understood that any aspect of the present disclosure may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the present disclosure. Although some benefits and advantages of the preferred aspects are mentioned, the scope of the present disclosure is not intended to be limited to particular benefits, uses or objectives. Rather, aspects of the present disclosure are intended to be broadly applicable to different technologies, system configurations, networks and protocols, some of which are illustrated by way of example in the figures and in the following description of the preferred aspects. The detailed description and drawings are merely illustrative of the present disclosure rather than limiting, the scope of the present disclosure being defined by the appended claims and equivalents thereof.

As used herein, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a processor specially configured to perform the functions discussed in the present disclosure. The processor may be a neural network processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. Alternatively, the processing system may comprise one or more neuromorphic processors for implementing the neuron models and models of neural systems described herein. The processor may be a microprocessor, controller, microcontroller, or state machine specially configured as described herein. A processor may also be implemented as a combination of computing devices, e.g., a combination of a DSP and a microprocessor, a plurality of microprocessors, one or more microprocessors in conjunction with a DSP core, or such other special configuration, as described herein.

The steps of a method or algorithm described in connection with the present disclosure may be embodied directly in hardware, in a software module executed by a processor, or in a combination of the two. A software module may reside in storage or machine readable medium, including random access memory (RAM), read only memory (ROM), flash memory, erasable programmable read-only memory (EPROM), electrically erasable programmable read-only memory (EEPROM), registers, a hard disk, a removable disk, a CD-ROM or other optical disk storage, magnetic disk storage or other magnetic storage devices, or any other medium that can be used to carry or store desired program code in the form of instructions or data structures and that can be accessed by a computer. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and processing, including the execution of software stored on the machine-readable media. Software shall be construed to mean instructions, data, or any combination thereof, whether referred to as software, firmware, middleware, microcode, hardware description language, or otherwise.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or specialized register files. Although the various components discussed may be described as having a specific location, such as a local component, they may also be configured in various ways, such as certain components being configured as part of a distributed computing system.

The machine-readable media may comprise a number of software modules. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a special purpose register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a computer-readable medium. Computer-readable media include both computer storage media and communication media including any storage medium that facilitates transfer of a computer program from one place to another.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means, such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A method for updating keypoints, comprising:

identifying, via a keypoint model, a first set of keypoints in a first image associated with a three-dimensional (3D) map of an environment, the first image having been captured during a first time period, each keypoint of the first set of keypoints being associated with a respective descriptor generated via the keypoint model;

identifying, via the keypoint model, a second set of keypoints in a second image associated with the 3D map, the second image having been captured during a second time period; and updating, via the keypoint model, one or more keypoints of the first set of keypoints by identifying correspondences between the first set of keypoints and the second set of keypoints based on the respective descriptors, the update comprising updating the respective descriptor of each of the one or more keypoints.

2. The method of claim 1, wherein the keypoint model is trained to label keypoints for two-dimensional (2D)-to-3D keypoint matching.

3. The method of claim 1, wherein:

the first image is one of a first group of images associated with the 3D map;

the second image is one of the second group of images associated with the 3D map;

one or more images of the second group of images are the same as one or more images of the first group of images; and the first group of images and the second group of images are two-dimensional (2D) images.

4. The method of claim 3, wherein the first group of images and the second group of images are captured via a sensor associated with a vehicle.

5. The method of claim 4, wherein the keypoint model is remotely located from the vehicle.

6. The method of claim 4, further comprising:

capturing, via the sensor, a 2D query image of the environment;

identifying a target image, from the first group of images and the second group of images, comprising a set of target keypoints that match a set of query keypoints of the 2D query image;

determining a current location within the 3D map based on identifying the target image; and autonomously or semi-autonomously navigating through the environment based on determining the current location, wherein the keypoint model and the 3D map are stored at the vehicle.

7. The method of claim 1, wherein each of the first set of keypoints and the second set of keypoints are associated with features of the environment.

8. An apparatus for labeling keypoints, comprising:

one or more processors; and one or more memories coupled with the one or more processors and storing processor-executable code that, when executed by the one or more processors, is configured to cause the apparatus to:

identify, via a keypoint model, a first set of keypoints in a first image associated with a three-dimensional (3D) map of an environment, the first image having been captured during a first time period, each keypoint of the first set of keypoints being associated with a respective descriptor generated via the keypoint model;

identify, via the keypoint model, a second set of keypoints in a second image associated with the 3D map, the second image having been captured during a second time period; and update, via the keypoint model, one or more keypoints of the first set of keypoints by identifying correspondences between the first set of keypoints and the second set of keypoints based on the respective descriptors, the update comprising updating the respective descriptor of each of the one or more keypoints.

9. The apparatus of claim 8, wherein the keypoint model is trained to label keypoints for two-dimensional (2D)-to-3D keypoint matching.

10. The apparatus of claim 8, wherein:

the first image is one of a first group of images associated with the 3D map;

the second image is one of the second group of images associated with the 3D map;

one or more images of the second group of images are the same as one or more images of the first group of images; and the first group of images and the second group of images are two-dimensional (2D) images.

11. The apparatus of claim 10, wherein the first group of images and the second group of images are captured via a sensor associated with a vehicle.

12. The apparatus of claim 11, wherein the keypoint model is remotely located from the vehicle.

13. The apparatus of claim 11, wherein execution of processor-executable code further causes the apparatus to:

capture, via the sensor, a 2D query image of the environment;

identify a target image, from the first group of images and the second group of images, comprising a set of target keypoints that match a set of query keypoints of the 2D query image;

determine a current location within the 3D map based on identifying the target image; and autonomously or semi-autonomously navigate through the environment based on determining the current location, wherein the keypoint model and the 3D map are stored at the vehicle.

14. The apparatus of claim 8, wherein each of the first set of keypoints and the second set of keypoints are associated with features of the environment.

15. A non-transitory computer-readable medium having program code recorded thereon for labeling keypoints, the program code executed by one or more processors and comprising:

program code to identify, via a keypoint model, a first set of keypoints in a first image associated with a three-dimensional (3D) map of an environment, the first image having been captured during a first time period, each keypoint of the first set of keypoints being associated with a respective descriptor generated via the keypoint model;

program code to identify, via the keypoint model, a second set of keypoints in a second image associated with the 3D map, the second image having been captured during a second time period; and program code to update, via the keypoint model, one or more keypoints of the first set of keypoints by identifying correspondences between the first set of keypoints and the second set of keypoints based on the respective descriptors, the update comprising updating the respective descriptor of each of the one or more keypoints.

16. The non-transitory computer-readable medium of claim 15, wherein the keypoint model is trained to label keypoints for two-dimensional (2D)-to-3D keypoint matching.

17. The non-transitory computer-readable medium of claim 15, wherein:

the first image is one of a first group of images associated with the 3D map;

the second image is one of the second group of images associated with the 3D map;

one or more images of the second group of images are the same as one or more images of the first group of images; and the first group of images and the second group of images are two-dimensional (2D) images.

18. The non-transitory computer-readable medium of claim 17, wherein the first group of images and the second group of images are captured via a sensor associated with a vehicle.

19. The non-transitory computer-readable medium of claim 18, wherein the keypoint model is remotely located from the vehicle.

20. The non-transitory computer-readable medium of claim 18, wherein the program code further comprises:

program code to capture, via the sensor, a 2D query image of the environment;

program code to identify a target image, from the first group of images and the second group of images, comprising a set of target keypoints that match a set of query keypoints of the 2D query image;

program code to determine a current location within the 3D map based on identifying the target image; and program code to autonomously or semi-autonomously navigate through the environment based on determining the current location, wherein the keypoint model and the 3D map are stored at the vehicle.

* * * * *